United States Patent
Mayama et al.

(10) Patent No.: US 11,773,120 B2
(45) Date of Patent: Oct. 3, 2023

(54) METHOD FOR PRODUCING OPTICALLY ACTIVE 2,3-BISPHOSPHINOPYRAZINE DERIVATIVE AND METHOD FOR PRODUCING OPTICALLY ACTIVE PHOSPHINE TRANSITION METAL COMPLEX

(71) Applicant: NIPPON CHEMICAL INDUSTRIAL CO., LTD., Tokyo (JP)

(72) Inventors: Daisuke Mayama, Tamura-gun (JP); Satoshi Takeshita, Tokyo (JP); Ken Tamura, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 16/617,827

(22) PCT Filed: Jun. 15, 2018

(86) PCT No.: PCT/JP2018/023019
§ 371 (c)(1),
(2) Date: Nov. 27, 2019

(87) PCT Pub. No.: WO2019/012918
PCT Pub. Date: Jan. 17, 2019

(65) Prior Publication Data
US 2020/0087330 A1  Mar. 19, 2020

(30) Foreign Application Priority Data
Jul. 11, 2017 (JP) .................................. 2017-135729

(51) Int. Cl.
*C07F 9/6509* (2006.01)
(52) U.S. Cl.
CPC .............................. *C07F 9/650994* (2013.01)
(58) Field of Classification Search
None
See application file for complete search history.

(56) References Cited

U.S. PATENT DOCUMENTS

| | | |
|---|---|---|
| 2007/0021610 A1 | 1/2007 | Imamoto et al. |
| 2010/0048894 A1 | 2/2010 | Kodama et al. |
| 2012/0252762 A1 | 10/2012 | Oohara et al. |

FOREIGN PATENT DOCUMENTS

| | | |
|---|---|---|
| JP | 2011-219413 A | 11/2011 |
| WO | 2011/078121 A1 | 6/2011 |
| WO | 2011/078122 A1 | 6/2011 |
| WO | 2011/126045 A1 | 10/2011 |
| WO | 2011/129365 A1 | 10/2011 |

OTHER PUBLICATIONS

Chemical Abstract Registry No. 1107608-80-9, indexed in the Registry File on STN CAS Online Feb. 17, 2009.*
International Search Report dated Aug. 28, 2018, issued in counterpart International Application No. PCT/JP2018/023019(1 page).

* cited by examiner

*Primary Examiner* — Po-Chih Chen
(74) *Attorney, Agent, or Firm* — WHDA, LLP

(57) ABSTRACT

In the method for producing an optically active 2,3-bisphosphinopyrazine derivative of the present invention, an optically active 2,3-bisphosphinopyrazine derivative represented by the following formula (3) is produced by the step of: preparing solution A containing 2,3-dihalogenopyrazine represented by the following formula (1)

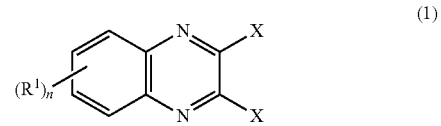

and a carboxylic acid amide coordinating solvent, lithiating an optically active R- or S-isomer of a hydrogen-phosphine borane compound represented by the following formula (2)

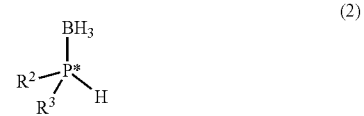

to give a lithiated phosphine borane compound; adding solution B containing the lithiated phosphine borane compound to the solution A to perform an aromatic nucleophilic substitution reaction; and then performing a deboranation reaction.

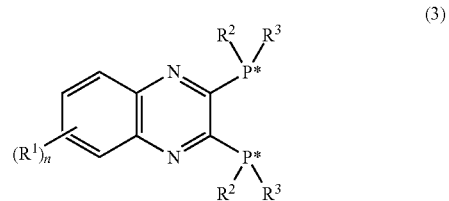

(For symbols in the formulas, see the description.)

8 Claims, No Drawings

METHOD FOR PRODUCING OPTICALLY ACTIVE 2, 3-BISPHOSPHINOPYRAZINE DERIVATIVE AND METHOD FOR PRODUCING OPTICALLY ACTIVE PHOSPHINE TRANSITION METAL COMPLEX

TECHNICAL FIELD

The present invention relates to a method for producing a 2,3-bisphosphinopyrazine derivative. More specifically, the present invention relates to a method for producing a 2,3-bisphosphinopyrazine derivative useful as, for example, a ligand for a metal complex used as an asymmetric catalyst in an asymmetric synthetic reaction, and a ligand source for a transition metal complex used as an anticancer agent, and also relates to a method for producing a phosphine transition metal complex useful as an anticancer agent.

BACKGROUND ART

Reactions in organic synthesis catalyzed by a metal complex with an optically active phosphine ligand have long been known. These reactions are very useful, on which many research results have been reported. In recent years, ligands in which phosphorus atoms themselves are asymmetric have been developed. For example, Patent Literature 1 and Patent Literature 2 disclose an optically active 2,3-bis(dialkylphosphino)pyrazine derivative which can provide a metal complex which exhibits excellent catalytic performance, and a method for producing the same.

In the methods disclosed in Patent Literature 1 and Patent Literature 2, for example, a solution containing 2,3-dichloroquinoxaline is added dropwise to a solution containing tert-butylmethylphosphine obtained by deprotonizing an optically active isomer of tert-butylmethylphosphine-borane, and the mixture is cooled to −70° C. or less to perform an aromatic nucleophilic substitution reaction to give an intermediate, a diphosphine-borane compound, and then the substance is deboranated to give a target optically active isomer of 2,3-bis(tert-butylmethylphosphino)quinoxaline.

Although the methods disclosed in Patent Literature 1 and Patent Literature 2 can provide the target 2,3-bis(tert-butylmethylphosphino)quinoxaline at good yield and high purity, a special cooling device is required to perform the aromatic nucleophilic substitution reaction at an extremely low temperature of −70° C. or less, and it also takes much time to cool the system to −70° C. or less and to increase the temperature to the temperature at which the subsequent deboranation reaction is performed, and thus the methods are industrially disadvantageous.

Patent Literature 4 described below discloses production of a target 2,3-bisphosphinopyrazine derivative through the step of adding a solution containing racemic tert-butylmethylphosphine borane to a solution containing potassium-tert-butoxide to perform a deprotonizing reaction of this racemic-tert-butylmethylphosphine borane, and then adding the solution after the deprotonizing reaction to a solution containing 2,3-dichloroquinoxaline, tetrahydrofuran and dimethylformamide at −10° C. to perform an aromatic nucleophilic substitution reaction, and subsequently adding tetramethylethylenediamine to the solution after the aromatic nucleophilic substitution reaction to perform a deboranation reaction.

However, the problem with the method disclosed in Patent Literature 4 below is that the target (R,R) or (S,S) isomer of a 2,3-bisphosphinopyrazine derivative having high optical purity cannot be obtained at good yield. Furthermore, use of a coordinating solvent in Patent Literature 4 is for facilitating production of a meso isomer and a racemic isomer from racemic phosphine borane to control the ratio of production of the meso isomer and the racemic isomer. Thus, the use is not for preparing a (R,R) or (S,S) isomer of a 2,3-bisphosphinopyrazine derivative at good yield and high optical purity as in the present invention.

Furthermore, Patent Literatures 3 to 6 described below disclose that a phosphine transition metal complex obtained by reacting a 2,3-bisphosphinopyrazine derivative with a transition metal salt of gold, copper or silver has an excellent anticancer effect.

CITATION LIST

Patent Literature

Patent Literature 1: U.S. Patent Application Publication No. 2007/0021610
Patent Literature 2: Japanese Patent Laid-Open No. 2011-219413
Patent Literature 3: U.S. Patent Application Publication No. 2010/0048894
Patent Literature 4: International Publication No. WO2011/078121
Patent Literature 5: U.S. Patent Application Publication No. 2012/0252762
Patent Literature 6: International Publication No. WO2011/129365

SUMMARY OF INVENTION

Thus, an object of the present invention is to provide an industrially advantageous method for producing a 2,3-bisphosphinopyrazine derivative. More specifically, an object of the present invention is to provide a method for producing an optically active 2,3-bisphosphinopyrazine derivative, in which a (S,S) or (R,R) isomer of an optically active 2,3-bis(dialkylphosphino)pyrazine derivative having high optical purity can be obtained at high yield. Another object is to provide a method for producing an optically active phosphine transition metal complex useful as an anticancer agent in an industrially advantageous manner.

The present inventors have conducted intensive studies and as a result have found that when solution B containing a phosphine borane compound obtained by lithiation of an optically active S- or R-isomer of a hydrogen-phosphine borane compound represented by a specific formula to solution A containing 2,3-dihalogenopyrazine represented by a specific formula and a carboxylic acid amide coordinating solvent, an aromatic nucleophilic substitution reaction can be performed at an industrially advantageous temperature in a short time, and a (S,S) or (R,R) isomer of a 2,3-bisphosphinopyrazine derivative having high optical purity can be obtained at high yield compared with a conventional method in which solution A is added to solution B, and have completed the present invention.

Accordingly, a first invention of the present invention is a method for producing an optically active 2,3-bisphosphinopyrazine derivative represented by the following formula (3), the method including the step of preparing solution A containing 2,3-dihalogenopyrazine represented by the following formula (1)

[Formula 1]

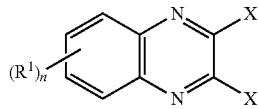

(1)

wherein X represents a halogen atom, $R^1$ represents a monovalent substituent, and n is an integer of 0 to 4, and a carboxylic acid amide coordinating solvent, lithiating an optically active R- or S-isomer of a hydrogen-phosphine borane compound represented by the following formula (2)

[Formula 2]

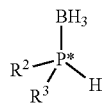

(2)

wherein $R^2$ and $R^3$ are an optionally substituted linear or branched alkyl group having 1 to 10 carbon atoms, an optionally substituted cycloalkyl group or an optionally substituted phenyl group, $R^2$ and $R^3$ are different from each other, and * represents an asymmetric center on a phosphorus atom, to give a lithiated phosphine borane compound, adding solution B containing the lithiated phosphine borane compound to the solution A to perform an aromatic nucleophilic substitution reaction, and then performing a deboranation reaction

[Formula 3]

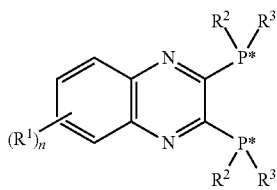

(3)

wherein $R^1$, $R^2$, $R^3$, * and n are as defined above.

A second invention to be provided by the present invention is a method for producing an optically active phosphine transition metal complex represented by the following formula (4), the method including:

a first step of preparing solution A containing 2,3-dihalogenopyrazine represented by the following formula (1)

[Formula 4]

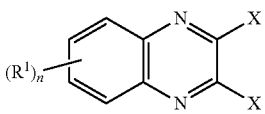

(1)

wherein X represents a halogen atom, $R^1$ represents a monovalent substituent, and n is an integer of 0 to 4, and a carboxylic acid amide coordinating solvent, and lithiating an optically active R- or S-isomer of a hydrogen-phosphine borane compound represented by the following formula (2)

[Formula 5]

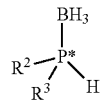

(2)

wherein $R^2$ and $R^3$ are an optionally substituted linear or branched alkyl group having 1 to 10 carbon atoms, an optionally substituted cycloalkyl group or an optionally substituted phenyl group, $R^2$ and $R^3$ are different from each other, and * represents an asymmetric center on a phosphorus atom, to give a lithiated phosphine borane compound, adding solution B containing the lithiated phosphine borane compound to the solution A to perform an aromatic nucleophilic substitution reaction, and then performing a deboranation reaction to obtain an optically active 2,3-bisphosphinopyrazine derivative represented by the following formula (3)

[Formula 6]

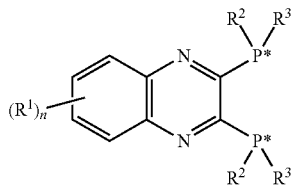

(3)

wherein $R^1$, $R^2$, $R^3$, * and n are as defined above; and a second step of reacting the 2,3-bisphosphinopyrazine derivative with a transition metal salt of gold, copper or silver

[Formula 7]

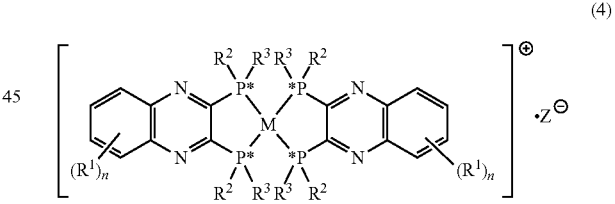

(4)

wherein $R^1$, $R^2$, $R^3$, * and n are as defined above; M represents a transition metal atom selected from the group consisting of gold, copper and silver; and $Z^-$ represents an anion.

DESCRIPTION OF EMBODIMENTS

Hereinafter the present invention will be described with reference to preferred embodiments.

In the method for producing an optically active 2,3-bisphosphinopyrazine derivative represented by the above formula (3) of the present invention, solution B containing an lithiated phosphine borane compound obtained by lithiating an optically active R- or S-isomer of a hydrogen-phosphine borane compound represented by the above formula (2) is added to solution A containing 2,3-dihalogenopyrazine represented by the above formula (1)

and a carboxylic acid amide coordinating solvent to perform an aromatic nucleophilic substitution reaction, and then a deboranation reaction is performed. This step corresponds to the first step of the method for producing an optically active phosphine transition metal complex of the present invention described later. Either solution A or solution B may be prepared first, or they may be prepared simultaneously.

X in 2,3-dihalogenopyrazine represented by the formula (1) is a halogen atom, and examples thereof include a chlorine atom, a bromine atom and an iodine atom. Of them, a chlorine atom is preferred.

$R^1$ in the formula represents a monovalent substituent, which is not particularly limited, and examples thereof include a linear or branched alkyl group having 1 to 5 carbon atoms, a nitro group, an amino group, a hydroxyl group, a fluoro group, a chloro group, a bromo group and an iodo group; and n is an integer of 0 to 4.

Commercially available products may be used as 2,3-dihalogenopyrazine represented by the formula (1). For example, 2,3-dichloroquinoxaline is available from Tokyo Chemical Industry, Co., Ltd.

$R^2$ and $R^3$ in the formula (2) are an optionally substituted linear or branched alkyl group having 1 to 10 carbon atoms, an optionally substituted cycloalkyl group or an optionally substituted phenyl group, and $R^2$ and $R^3$ are different from each other.

Examples of alkyl groups represented by $R^2$ and $R^3$ include a methyl group, an ethyl group, an isopropyl group, a n-propyl group, an isobutyl group, a n-butyl group, a sec-butyl group, a tert-butyl group, an isoheptyl group, n-heptyl group, an isohexyl group and a n-hexyl group. Examples of cycloalkyl groups represented by $R^2$ and $R^3$ include a cyclopentyl group and cyclohexyl group. When $R^2$ and/or $R^3$ are a cycloalkyl group having a substituent or a phenyl group having a substituent, examples of substituents include an alkyl group, an alkoxy group, a nitro group, an amino group, a hydroxyl group, a fluoro group, a chloro group, a bromo group and an iodo group. When $R^2$ and/or $R^3$ are an alkyl group having a substituent, examples of substituents include a phenyl group, an alkoxy group, a nitro group, an amino group, a hydroxyl group, a fluoro group, a chloro group, a bromo group and an iodo group. It is preferable that when an alkyl group is present as a substituent, the alkyl group has 1 to 5 carbon atoms, and when an alkoxy group is present as a substituent, the alkoxy group has 1 to 5 carbon atoms.

In the present invention, in order to use the target 2,3-bisphosphinopyrazine derivative as an asymmetric catalyst, the optically active R- or S-isomer of the hydrogen-phosphine borane compound represented by the formula (2) has an asymmetric center on the phosphorus atom. Optically active isomers have optical rotation, and thus racemates are not included in optically active isomers. Furthermore, it is particularly preferable that in the formula (2), $R^2$ is a t-butyl group or an adamantyl group and $R^3$ is a methyl group. It is preferable that the optically active R- or S-isomer of the hydrogen-phosphine borane compound represented by the formula (2) has a high optical purity of, for example, preferably 95% ee or more in order to produce a 2,3-bisphosphinopyrazine derivative having high optical purity efficiently.

The optically active R- or S-isomer of the hydrogen-phosphine borane compound represented by the formula (2) may be prepared by a known method. Examples of such methods include the methods disclosed in Japanese Patent Laid-Open No. 2001-253889, Japanese Patent Laid-Open No. 2003-300988, Japanese Patent Laid-Open No. 2007-70310, Japanese Patent Laid-Open No. 2010-138136 and J. Org. Chem, 2000, vol. 65, P4185-4188.

The solution A contains 2,3-dihalogenopyrazine represented by the formula (1) and a carboxylic acid amide coordinating solvent, and may be a solution or a slurry.

The present inventors considers that one of the reasons why the target product having high optical purity is obtained at high yield in a relatively short time in the present invention is as follow. That is, in the present invention, solution A in the aromatic nucleophilic reaction contains a carboxylic acid amide coordinating solvent, and thus the carboxylic acid amide coordinating solvent is coordinated with a lithium salt of a chiral phosphine borane compound to be added, from which protons have been extracted; the carboxylic acid amide coordinating solvent is highly coordinated with lithium compared with an ether solvent such as tetrahydrofuran, and thus the distance between the anionic site and the site of a lithium cation in a chiral phosphine borane compound is increased as shown in the following chemical formula (5), and thus the anionic site in a chiral phosphine borane compound easily attacks the halogen atoms in 2,3-dihalogenopyrazine of the formula (1), facilitating the reaction. Furthermore, as the solubility of the above lithium salt is improved, the reactivity is increased. In the present invention, a coordinating solvent means a solvent which can be coordinated with lithium. Comparative Example 2 described later shows that the present invention is not effective when the carboxylic acid amide coordinating solvent is not used.

[Formula 8]

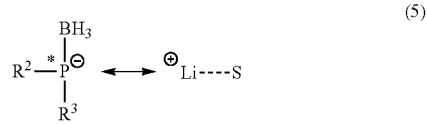

(5)

(wherein $R^2$, $R^3$ and * are as defined above; S represents a coordinating solvent.)

Examples of carboxylic acid amide coordinating solvents in solution A include N,N-dimethylformamide (DMF), N,N-dimethylacetamide (DMA), 1,3-dimethyl-2-imidazolidinone (DMI), N-methyl-2-pyrrolidone (NMP), N-methylformamide, N-methylacetamide, N,N-dibutylformamide and N,N-dibutylacetamide. Of them, N,N-dimethylformamide (DMF) is preferred from the viewpoint of reactivity and industrial availability.

The proportion of the carboxylic acid amide coordinating solvent in all solvents constituting solution A is, in volume proportion, 15% by volume or more and 100% by volume or less, particularly preferably 20% by volume or more and 100% by volume or less, and especially preferably 30% by volume or more and 70% by volume or less from the viewpoint of reactivity and economy. When the proportion of the carboxylic acid amide coordinating solvent in all solvents constituting solution A is 15% by volume or more, particularly 20% by volume or more, the reaction speed can be increased and productivity can be improved. When the proportion of the carboxylic acid amide coordinating solvent in all solvents constituting solution A is 70% by volume or less, the carboxylic acid amide coordinating solvent can be easily removed and the cost can be reduced to improve yield and productivity. In the present description, the volume ratio refers to the ratio at room temperature.

An ether solvent is preferably used as another solvent in solution A because it improves the solubility of the lithiated phosphine borane compound in the reaction solution in which solution A and solution B are mixed. Examples of ether solvents include diethyl ether, diisopropyl ether, dibutylether, dioxane, cyclopentyl methyl ether and tetrahydrofuran. Of them, tetrahydrofuran is preferred from the viewpoint of polarity and solubility of raw materials.

When an ether solvent is used for solution A, the ratio of the ether solvent to the carboxylic acid amide coordinating solvent by volume (the former: the latter) is 1.0:0.2 or more and 1.0:100 or less, particularly preferably 1.0:0.3 or more and 1.0:100 or less, and especially preferably 1.0:0.5 or more and 1.0:3.0 or less from the viewpoint of reactivity and economy. When the ratio by volume of the ether solvent to the carboxylic acid amide coordinating solvent (the former: the latter) is 1.0:0.2 or more, particularly 1.0:0.3 or more, the reaction speed can be increased and productivity can be improved. When the ratio by volume of the ether solvent to the carboxylic acid amide coordinating solvent (the former: the latter) is 1.0:100 or less, the carboxylic acid amide coordinating solvent can be easily removed to improve yield and productivity.

When an ether solvent is used for solution A or solution B, the ratio by volume of the ether solvent to the carboxylic acid amide coordinating solvent (the former: the latter) in the reaction solution after adding solution B to solution A is 1.0:0.05 or more 1.0:100 or less, particularly preferably 1.0:0.15 or more and 1.0:100 or less, and especially preferably 1.0:0.25 or more and 1.0:3.0 or less from the viewpoint of reactivity and economy. When the ratio by volume of the ether solvent to the carboxylic acid amide coordinating solvent (the former: the latter) is 1.0:0.05 or more, particularly 1.0:0.15 or more, the reaction speed can be increased and productivity can be improved. When the ratio by volume of the ether solvent to the carboxylic acid amide coordinating solvent (the former: the latter) is 1.0:3.0 or less, the carboxylic acid amide coordinating solvent can be easily removed to improve yield and productivity.

2,3-dihalogenopyrazine represented by the formula (1) is not necessarily completely dissolved in solution A, and the reaction may be started with a slurry.

The concentration of 2,3-dihalogenopyrazine represented by the formula (1) in solution A is preferably 0.01 to 30% by mass from the viewpoint of reactivity and productivity, and more preferably 0.03 to 20% by mass from the same point of view.

A preferred temperature of solution A at the time when solution B is started to be added as described later is the same as a preferred temperature at which solution B is added to solution A describe later, because a product having high optical purity can be obtained with sufficient reactivity.

Solution B contains a lithiated phosphine borane compound obtained by lithiating the hydrogen-phosphine borane compound represented by the formula (2).

In the preparation of solution B, a solution of the hydrogen-phosphine borane compound represented by the formula (2) dissolved in a solvent may be mixed with a lithiating agent to lithiate the hydrogen-phosphine borane compound represented by the formula (2). It is preferable that in this case the lithiating agent is added to the solution of the hydrogen-phosphine borane compound represented by the formula (2) dissolved in a solvent. The advantage of this method is that the amount of by-product is reduced because the lithiated product is not consistently exposed to an excessive amount of a lithiating agent compared with the case where a solution of the hydrogen-phosphine borane compound represented by the formula (2) dissolved in a solvent is added to a solution of a lithiating agent.

In the preparation of solution B, the concentration of the hydrogen-phosphine borane compound represented by the formula (2) in the solution before adding n-butyllithium is preferably 1 to 30% by mass from the viewpoint of reactivity and productivity, and more preferably 5 to 20% by mass from the same point of view.

An organic lithium compound is used as the lithiating agent for solution B. Examples of organic lithium compounds include methyllithium, ethyllithium, n-propyllithium, sec-propyllithium, n-butyllithium, sec-butyllithium and tert-butyllithium. Of them, n-butyllithium is preferred from the viewpoint of moderate basicity and sufficient reactivity.

For the amount to be added of the lithiating agent, the molar ratio of the lithiating agent to the hydrogen-phosphine borane compound represented by the formula (2) is preferably 1.0 to 1.5 from the viewpoint of economy and reactivity, and more preferably 1.0 to 1.2 from the same point of view.

In the preparation of solution B, an inert solvent which can dissolve the hydrogen-phosphine borane compound represented by the formula (2) and a phosphine borane compound to be produced may be used as a solvent used for the solution before adding n-butyllithium. Examples of such solvents include N,N-dimethylformamide, hexane and toluene in addition to the above ether solvent. These solvent may be used alone or as a mixed solvent. Of them, ether solvents are particularly preferred from the viewpoint of solubility of lithiated products, and tetrahydrofuran are most preferred.

The temperature at which the lithiating agent is added is preferably −20 to 20° C., and more preferably −20 to 0° C. because the hydrogen-phosphine borane compound represented by the formula (2) can be lithiated while maintaining its optical purity. Addition of the lithiating agent to a solution containing the hydrogen-phosphine borane compound represented by the formula (2) facilitates lithiation of the hydrogen-phosphine borane compound represented by the formula (2), while an aging reaction may also be performed as necessary after the addition of the lithiating agent in order to complete the reaction of lithiation.

One of the features of the present method is to add the solution B to the solution A prepared as described above to perform an aromatic nucleophilic substitution reaction. Compared with a conventional method in which solution A is added to solution B, the temperature at which the aromatic nucleophilic substitution reaction is performed can be increased to an industrially advantageous temperature. Furthermore, a carboxylic acid amide coordinating solvent is added to the solution A as a solvent in addition to an ether solvent to perform the aromatic nucleophilic substitution reaction, and thus an optically active 2,3-bisphosphinopyrazine derivative having high optical purity can be prepared at high yield in a relatively short time. This is also shown in Examples and Comparative Example 1 described later. In the present method of production, the resulting optically active 2,3-bisphosphinopyrazine derivative has an optical purity of preferably 95% ee or more, and more preferably 98% ee or more.

Electrons in carbon atoms to which halogen is bonded in 2,3-dihalogenopyrazine represented by the formula (1) are attracted by an adjacent nitrogen atom. Thus, the lithiated phosphine borane compound, which is formed by deprotonating a hydrogen-phosphine borane compound, namely, a nucleophilic reagent, attacks the carbon atoms to cause an aromatic nucleophilic substitution reaction. Then, an intermediate, i.e., a borane isomer of an optically active 2,3-bisphosphinopyrazine derivative, which is represented by the following formula (6), is produced in the reaction system.

[Formula 9]

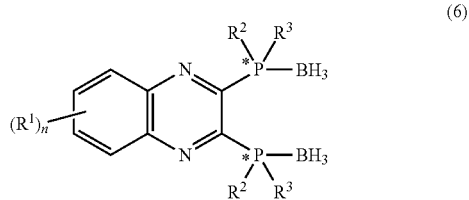

(6)

(wherein $R^1$, $R^2$, $R^3$, * and n are as defined above.)

Solution B is added to solution A so that the molar ratio of the lithiated phosphine borane compound obtained from the hydrogen-phosphine borane compound represented by the formula (2) to 2,3-dihalogenopyrazine represented by the formula (1) in solution A is 2.0 to 4.0, and preferably 2.0 to 3.0 from the viewpoint of reactivity and economy.

The rate of adding solution B is not particularly limited, and it is preferable to add solution B at a constant rate in order to obtain a product with stable quality. Solution B is added to solution A at a scale of, for example, 500 L, for preferably over 30 minutes or more, and more preferably over 60 minutes or more in order to control reaction heat. Solution B may be added to solution A continuously or intermittently.

Regardless of adding continuously or intermittently, solution B is added to solution A at a scale of, for example, 500 L, for preferably over 480 minutes or less. It is preferable that the inner temperature of the mixture during addition is maintained within the preferred range of temperature at which solution B is added, which will be described later.

The temperature at which solution B is added is preferably −20 to 50° C., more preferably −20 to 20° C., and most preferably −20 to 0° C. in order to obtain a product having high optical purity at high yield. The aromatic nucleophilic substitution reaction occurs at the time of adding solution B to solution A, and thus the temperature of the mixture when adding solution B to solution A is regarded as the reaction temperature of the aromatic nucleophilic substitution reaction.

After addition of solution B, an aging reaction may be subsequently performed if necessary, in order to complete the aromatic nucleophilic substitution reaction. The temperature of the aging reaction is preferably −20 to 50° C., and particularly preferably −20 to 30° C. in order to obtain a product having high optical purity at high yield. The time of aging may be determined by assessing the residual ratio of a 2,3-bisphosphinopyrazine derivative derived from solution A and the lithiated phosphine borane compound derived from solution B in an analysis of the reaction solution by HPLC and the like. The time of aging is, for example, preferably 10 minutes or more and 5 hours or less so as to prevent the decomposition of the product.

Then, a deboranation reaction of the above intermediate, i.e., the borane isomer of the 2,3-bisphosphinopyrazine derivative represented by the formula (6), is performed in the present method of production.

The deboranation reaction of the borane isomer of the 2,3-bisphosphinopyrazine derivative represented by the formula (6) may be performed by adding a deboranating agent to the reaction system containing the borane isomer of the 2,3-bisphosphinopyrazine derivative represented by the formula (6).

Examples of deboranating agents include N,N,N',N'-tetramethylethylenediamine (TMEDA), triethylenediamine (DABCO), triethylamine, $HBF_4$ and trifluoromethanesulfonic acid, and TMEDA is preferred. The amount of the deboranating agent to be added is usually 2 to 20 equivalents, and preferably 3 to 10 equivalent relative to 2,3-dihalogenopyrazine represented by the formula (1).

The reaction temperature of the deboranation reaction is preferably −20 to 80° C., more preferably −20 to 50° C., and particularly preferably 10 to 30° C. in order to obtain a 2,3-bisphosphinopyrazine derivative represented by the formula (3) having high optical purity. The reaction time of the deboranation reaction is 10 minutes or more, preferably 1 to 10 hours, and more preferably 1 to 5 hours.

The 2,3-bisphosphinopyrazine derivative represented by the formula (3) produced by the deboranation reaction may be subjected to a purifying process such as washing and separation, extraction, crystallization, distillation, sublimation and column chromatography as needed.

The optically active 2,3-bisphosphinopyrazine derivative represented by the formula (3) obtained by the present method of production serves as a ligand to form a complex with transition metal. This complex is useful as a catalyst for asymmetric synthesis. Examples of asymmetric synthesis include asymmetric hydrogenation, asymmetric 1,4-addition to electron-deficient olefin using organic boronic acid, asymmetric hydrosilylation and asymmetric cyclization.

Examples of transition metals which can form a complex include rhodium, ruthenium, iridium, palladium, platinum, nickel and iron. Preferred metals are palladium and rhodium. Examples of methods for forming a complex with rhodium using 2,3-bis(dialkylphosphino)pyrazine derivative represented by the formula (1) as a ligand include the method disclosed in The Fourth Series of Experimental Chemistry (edited by Chemical Society of Japan, published by Maruzen Publishing Co., Ltd., Vol. 18, pp. 327 to 353).

Of the 2,3-bisphosphinopyrazine derivatives represented by the formula (3) obtained by the present method of production, optically active compounds in which $R^2$ and $R^3$ are different from each other are useful as a ligand source for an optically active phosphine transition metal complex used as an anticancer agent.

Next, a preferred method for producing an optically active phosphine transition metal complex represented by the following formula (4) will be described. This phosphine transition metal complex is obtained by the second step of reacting the optically active 2,3-bisphosphinopyrazine derivative represented by the formula (3) prepared in the first step described above with a salt of gold, copper or silver.

[Formula 10]

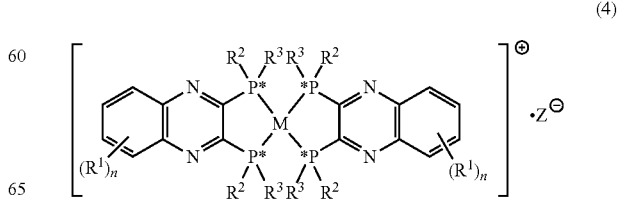

(4)

(wherein $R^1$, $R^2$, $R^3$, * and n are as defined above; M represents a transition metal atom selected from the group consisting of gold, copper and silver; and $Z^-$ represents an anion.)

$R^1$, $R^2$, $R^3$ and n in the formula of the optically active phosphine transition metal complex represented by the formula (4) correspond to $R^1$ and n in the formula of 2,3-dihalogenopyrazine represented by the formula (1), and $R^2$ and $R^3$ in the formula of the hydrogen-phosphine borane compound represented by the formula (2). M in the formula of the optically active phosphine transition metal complex represented by the formula (4) represents a transition metal atom selected from the group consisting of gold, copper and silver. $Z^-$ represents an anion and is preferably a monovalent anion. Examples of anions represented by $Z^-$ include a chlorine ion, a bromine ion, an iodine ion, a boron tetrafluoride ion, a hexafluorophosphate ion, and a perchloric acid ion.

Examples of salts of gold, copper or silver to be reacted with the optically active 2,3-bisphosphinopyrazine derivative represented by the formula (3) include a halogenated product, a nitrate, a perchlorate, a tetrafluoroborate or a hexafluorophosphate of those metals. Those metals have a valence of 1. These metal salts may be two or more salts in which one or both of the metals and the anions are different.

Examples of preferred salts of gold include chloroauric acid (I), gold (I) chloride and tetrabutylammonium chloride. gold (I) chloride (see "The Fifth Series of Experimental Chemistry 21" edited by Chemical Society of Japan, published by Maruzen Publishing Co., Ltd., on Mar. 30, 2004, p. 366 to 380, Aust. J. Chemm., 1997, 50, 775-778.) Preferred transition metal salts of copper include copper (I) chloride, copper (I) bromide and copper (I) iodide ("The Fifth Series of Experimental Chemistry 21" edited by Chemical Society of Japan, published by Maruzen Publishing Co., Ltd., on Mar. 30, 2004, p. 349 to 361). Furthermore, preferred transition metal salts of silver include silver (I) chloride, silver (I) bromide and silver (I) iodide ("The Fifth Series of Experimental Chemistry 21" edited by Chemical Society of Japan, published by Maruzen Publishing Co., Ltd., on Mar. 30, 2004, p. 361 to 366). The transition metal salt for the method for producing a phosphine transition metal complex of the present invention may be anhydrous or hydrous.

The molar ratio of the 2,3-bisphosphinopyrazine derivative represented by the formula (3) to the salt of gold, copper or silver is preferably 1 to 5 times by mole, more preferably 1.8 to 2.2 times by mole based on 1 mole of metal atom. The reaction may be performed in a solvent such as acetone, acetonitrile, methanol, ethanol, tetrahydrofuran, dichloromethane and chloroform. The reaction temperature is preferably −20 to 60° C., and more preferably 0 to 25° C., and the reaction time is preferably 0.5 to 48 hour, and further preferably 1 to 3 hours. This reaction produces a phosphine transition metal complex represented by the formula (4). After completion of the reaction, the complex may be purified by a routine method where necessary.

When $R^2$ and $R^3$ in the formula of the optically active phosphine transition metal complex represented by the formula (4) are different from each other, the complex contains 4 asymmetric phosphorous atoms, and thus the complex has many isomers. The phosphine transition metal complex prepared by the present method is a single enantiomer in which the steric configuration on the phosphorus atom is (R,R)(R,R) or (S,S)(S,S).

In the optically active 2,3-bisphosphinopyrazine derivative represented by the formula (3), which is the starting material in the second step, two phosphorus atoms form a chiral center when $R^2$ and $R^3$ are different from each other. A desired optically active isomer is produced in the first step and then the optically active isomer is used in the second step to give a phosphine transition metal complex having an objective steric configuration (see, for example, Japanese Patent Laid-Open No. 2007-320909, International Publication No. WO2011/078121, International Publication No. WO2011/072902, International Publication No. WO2011/129365.

The anion in the optically active phosphine transition metal complex represented by the formula (4) prepared as described above may be converted to other desired anions. For example, first a phosphine transition metal complex in which $Z^-$ in the formula (3) is a halogenide ion is synthesized by the above method, and then this phosphine transition metal complex is reacted with an inorganic acid or an organic acid having a desired anion, or an alkali metal salt thereof in a suitable solvent to give a phosphine transition metal complex in which $Z^-$ is a desired anion. Details of such a method are disclosed in, for example, Japanese Patent Laid-Open No. 10-147590, Japanese Patent Laid-Open No. 10-114782 and Japanese Patent Laid-Open No. 61-10594.

The optically active phosphine transition metal complex represented by the formula (4) prepared as described above is useful as an anticancer agent.

EXAMPLES

Hereinafter, the present invention will be described with reference to Examples, but the present invention is not limited to these Examples. The volume of the solvents described in Examples and Comparative Examples is a value at room temperature (25° C.)

Synthesis of (S)-tert-butylmethylphosphine-borane 2.1 mL (18 mmol) of benzoyl chloride was added dropwise to a solution in which 2.22 g (15.0 mmol) of (S)-tert-butyl(hydroxymethyl)methylphosphine-borane (92% ee) was dissolved in 10 ml of pyridine at 0° C. with stirring. Then, the reaction mixture was heated to room temperature (25° C.). After 1 hour, the reaction mixture was diluted with water and extracted with ether three times. The resulting organic layer was washed with 1M hydrochloric acid, an aqueous solution of 2.5% by weight sodium hydrogen carbonate and saturated saline sequentially, and dehydrated with sodium sulfate. After removing the solvent, the residue was purified by silica gel column chromatography (mobile phase: hexane/ethyl acetate=3/1 in volume ratio). A colorless solid was obtained, and the solid was recrystallized twice using a hexane/ethyl acetate mixed solvent. Optically pure benzoyloxymethyl(tert-butyl)methylphosphine-borane was prepared as described above. The yield was 2.34 g (62%).

6.05 g (24.0 mmol) of benzoyloxymethyl(tert-butyl)methylphosphine-borane (99% ee) was dissolved in 25 mL of ethanol to give a solution. An aqueous potassium hydroxide solution was separately prepared by dissolving 4.0 g (72 mmol) of potassium hydroxide in 15 mL of water. This aqueous potassium hydroxide solution was added dropwise to the above solution. Hydrolysis was completed in about 1 hour. The reaction mixture was diluted with water and extracted with ether three times. The extract was washed with saturated saline, and dehydrated with sodium sulfate. The solvent was removed by a rotary evaporator, and the residue was purified by silica gel column chromatography (mobile phase: hexane/ethyl acetate=3/1 in volume ratio) to give (S)-tert-butyl(hydroxymethyl)methylphosphine-borane. This compound was dissolved in 72 mL of acetone. The acetone solution was gradually added to an aqueous solution (0° C.) prepared by dissolving 13.5 g (240 mmol) of potassium hydroxide, 19.4 g (72.0 mmol) of potassium persulfate and 624 mg (2.4 mmol) of ruthenium trichloride trihydrate in 150 mL of water, with vigorously stirring the aqueous solution. After 2 hours, the reaction mixture was neutralized with 3M hydrochloric acid and extracted with ether three times. The extract was washed with saturated saline, and dehydrated with sodium sulfate. The solvent was removed by a rotary evaporator at room temperature (25° C.), and the residue was purified by silica gel column chromatography (mobile phase: pentane/ether=8/1 in volume ratio). (S)-tert-butylmethylphosphine-borane having an optical purity of 99% ee or more was prepared in this way. The yield was 2.27 g (80%) and the purity was 92.5%.

Example 1

Synthesis of (R,R)-2,3-bis(tert-butylmethylphosphino)quinoxaline (a3)

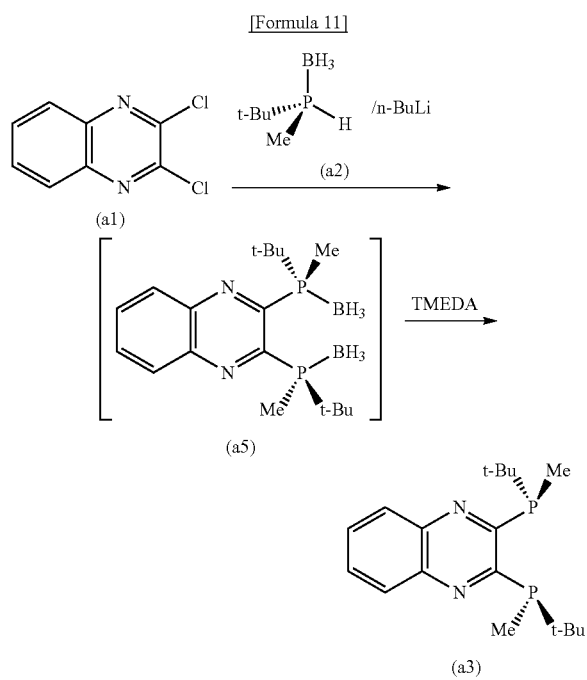

The air in a 300 mL four-neck flask which had been thoroughly dried was replaced with nitrogen, and then the flask was charged with 111.46 g (135.0 mmol) of a solution of 14.2% by mass (S)-tert-butylmethylphosphine-borane (a2) prepared above in tetrahydrofuran. The mixture was cooled to −10° C. under nitrogen atmosphere, and then 59.3 g of a 15% by mass n-butyllithium solution in hexane was added dropwise thereto over 1 hour. The mixture was aged for 1 hour at −10° C. to give solution B.

A 2,000 mL four-neck flask which had been thoroughly dried was separately prepared, and the air in the flask was replaced with nitrogen. Then the flask was charged with 8.97 g (45.0 mmol) of 2,3-dichloroquinoxaline (a1), tetrahydrofuran (81 ml), and 90 ml of N,N-dimethylformamide, and the mixture was cooled to −10° C. to give solution A.

Solution B was added to solution A at a constant rate over 40 minutes so that the inner temperature was kept at about −10° C. The mixture was a white slurry, and the slurry once turned to green and finally to red brown.

After completion of the dropwise addition, the temperature of the slurry was gradually increased to room temperature (25° C.), and the slurry was aged for 3 hours. Then, 52.6 g (450.0 mmol) of tetramethylenediamine was added thereto, and the slurry was aged overnight. As a result, deboranation reaction thoroughly progressed and the slurry turned to orange.

Subsequently, 180 mL of 10% by mass hydrochloric acid was added thereto to stop the reaction, and the aqueous phase was discarded. Furthermore, 45 mL of water and 17 mL of 5% by mass hydrochloric acid was added to thereto to wash the reaction solution, and the aqueous phase was discarded. Then, 45 mL of an aqueous 2.5% by mass sodium bicarbonate solution and 45 mL of water were sequentially added thereto to wash the reaction solution, and the aqueous phase was discarded. The solvent was distilled off by using a vacuum pump, and as a result the resultant was entirely solidified. 90 mL of methanol was added thereto, and the temperature was increased to dissolve the solid completely. Then the mixture was gradually cooled, and as a result an orange crystal precipitated. The crystal was rinsed with cooled methanol, and then dried in reduced pressure to give (R,R)-2,3-bis(tert-butylmethylphosphino)quinoxaline (a3) (10.58 g, yield 70.3%). This crystal had a purity of 99.0% as measured by $^{31}$P NMR, and an optical purity of 99.5% ee or more.

(Data for Identification of Compound (a3))
Melting point: 102 to 103° C.,
Specific rotation [α] D26-54.5 (c 1.00, CHCl$_3$), Melting point: 102-103° C.,
Specific optical rotation $[α]^D_{26}$−54.5 (c 1.00, CHCl$_3$), $^1$H NMR (500.15 MHz, CDCl$_3$): δ 1.00-1.03 (m, 18H), 1.42-1.44 (m, 6H), 7.70-7.74 (m, 2H), 8.08-8.12 (m, 2H), $^{13}$C NMR (125.76 MHz, CDCl$_3$): δ 4.77 (t, J=4.1 Hz), 27.59 (t, J=7.4 Hz), 31.90 (t, J=7.4 Hz), 129.50, 129.60, 141.63, 165.12 (dd, J=5.7, 2.4 Hz), $^{31}$P NMR (202.46 MHz, CDCl$_3$): δ-16.7 (s)

Example 2

Synthesis of (R,R)-2,3-bis(tert-butylmethylphosphino)quinoxaline (a3)

Reaction was performed in the same manner as in Example 1 except for changing the amount of tetrahydrofuran to 81 ml and the amount of N,N-dimethylformamide to 45 ml in solution A to give (R,R)-2,3-bis(tert-butylmethylphosphino)quinoxaline (a3) (yield 69.4%). This crystal had a purity of 99.2% as measured by $^{31}$P NMR, and an optical purity of 99.5% ee or more.

Example 3

Synthesis of (R,R)-2,3-bis(tert-butylmethylphosphino)quinoxaline (a3)

Reaction was performed in the same manner as in Example 1 except for changing the amount of tetrahydrofuran to 81 ml and the amount of N,N-dimethylformamide to 20 ml in solution A to give (R,R)-2,3-bis(tert-butylmethylphosphino)quinoxaline (a3) (yield 64.6%). This crystal had a purity of 99.1% as measured by $^{31}$P NMR, and an optical purity of 99.5% ee or more.

Comparative Example 1

Synthesis of (R,R)-2,3-bis(tert-butylmethylphosphino)quinoxaline (a3)

Reaction was performed in the same manner as in Example 1 except for adding solution A to solution B over 20 minutes while maintaining the inner temperature at about −10° C. to give (R,R)-2,3-bis(tert-butylmethylphosphino)quinoxaline (a3) (yield 44%). This crystal had a purity of 99.4% as measured by $^{31}$P NMR, and an optical purity of 99.5% ee or more.

Comparative Example 2

Reaction was performed in the same manner as in Example 1 except for changing the amount of tetrahydrofuran to 200 ml to give (R,R)-2,3-bis(tert-butylmethylphosphino)quinoxaline (a3) (yield 48%). This crystal had a purity of 96.5% as measured by $^{31}$P NMR, and an optical purity of 99.5% ee or more.

TABLE 1

| | Solution A | | Volume ratio of DMF/THF in reaction solution after mixing solution A and solution B | Reaction temperature of aromatic nucleophilic substitution (° C). |
|---|---|---|---|---|
| | Method of dropping | DMF (% by volume) | Volume ratio of DMF/THF | | |
| Example 1 | Adding solution B to solution A | 52.6 | 1.11 | 0.32 | −10 |
| Example 2 | Adding solution B to solution A | 35.7 | 0.56 | 0.19 | −10 |
| Example 3 | Adding solution B to solution A | 19.8 | 0.25 | 0.09 | −10 |
| Comparative Example 1 | Adding solution A to solution B | 52.6 | 1.11 | 0.32 | −10 |
| Comparative Example 2 | Adding solution B to solution A | 0.0 | 0.0 | 0.0 | −10 |

TABLE 2

| | Yield (%) | Purity (%) | Optical purity (% ee) |
|---|---|---|---|
| Example 1 | 70.3 | 99.0 | 99.5 or more |
| Example 2 | 69.4 | 99.2 | 99.5 or more |
| Example 3 | 64.6 | 99.1 | 99.5 or more |
| Comparative Example 1 | 44 | 99.4 | 99.5 or more |
| Comparative Example 2 | 48 | 96.5 | 99.5 or more |

Example 4

Synthesis of bis(2,3-bis(tert-butylmethylphosphino)quinoxaline)gold (I) chloride (4a)

A 500 ml two-neck flask in which the air was replaced with nitrogen gas was charged with 5.50 g (16.4 mmol) of (R,R)-2,3-bis(tert-butylmethylphosphino)quinoxaline (a3) prepared in Example 1 and 220 ml of deaerated THF. 4.19 g (8.2 mmol) of tetrabutylammonium gold (I) dichloride was added thereto and the mixture was stirred at room temperature (25° C.) for 20 hours. The precipitate was filtered and the filtrate was dried. The resulting brown solid was dried under reduced pressure to give 7.26 g of bis(2,3-bis(tert-butylmethylphosphino)quinoxaline)gold (I) chloride (4a) represented by the following formula (4a). The yield was 98% in this case.

(Data for Identification of Compound (4a))

$^{31}$P-NMR(CDCl$_3$); 13.6

$[\alpha]^D$=+195.3 (c=0.5, methanol, 25° C.)

[Formula 12]

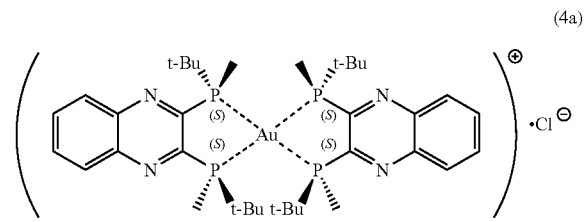

(4a)

INDUSTRIAL APPLICABILITY

In the method for producing an optically active 2,3-bisphosphinopyrazine derivative of the present invention, an aromatic nucleophilic substitution reaction can be performed at an industrially advantageous temperature in a short time, and a 2,3-bisphosphinopyrazine derivative having high optical purity can be obtained at high yield. Furthermore, an optically active phosphine transition metal complex useful as an anticancer agent can be obtained in an industrially advantageous manner through those series of steps according to the present invention.

The invention claimed is:

1. A method for producing an optically active 2,3-bisphosphinoquinoxaline derivative represented by the following formula (3) having an optical purity of 95% ee or more, the method comprising:

a step of preparing solution A comprising 2,3-dihalogenoquinoxaline represented by the following formula (1)

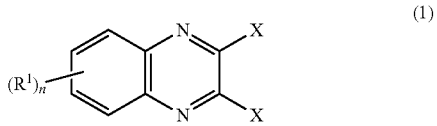

(1)

wherein X represents a halogen atom, R$^1$ represents a monovalent substituent, and n is an integer of 0 to 4, and a coordinating solvent which can be coordinated with lithium, a step of lithiating one of an optically active R-isomer and an optically active S-isomer of a hydrogen-phosphine borane compound represented by the following formula (2)

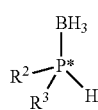

(2)

wherein $R^2$ and $R^3$ are an optionally substituted linear or branched alkyl group having 1 to 10 carbon atoms, an optionally substituted cycloalkyl group or an optionally substituted phenyl group, $R^2$ and $R^3$ are different from each other, and * represents an asymmetric center on a phosphorus atom, to give a solution B comprising a lithiated phosphine borane compound, and a step of adding the solution B comprising the lithiated phosphine borane compound to the solution A to perform an aromatic nucleophilic substitution reaction, and then performing a deboranation reaction by adding a deboranating agent, thereby producing the optically active 2,3-bisphosphinoquinoxaline derivative represented by the following formula (3) as a result of the deboranation reaction,

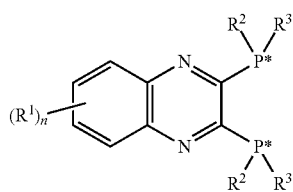

(3)

wherein $R^1$, $R^2$, $R^3$, * and n are as defined in formulae (1) and (2), wherein the proportion of the coordinating solvent which can be coordinated with lithium in all solvents constituting the solution A is 30% by volume or more and 70% by volume or less.

2. The method for producing an optically active 2,3-bisphosphinoquinoxaline derivative according to claim 1, wherein the coordinating solvent which can be coordinated with lithium is N,N-dimethylformamide.

3. The method for producing an optically active 2,3-bisphosphinoquinoxaline derivative according to claim 1, wherein $R^2$ is a t-butyl group or an adamantyl group and $R^3$ is a methyl group.

4. The method for producing an optically active 2,3-bisphosphinoquinoxaline derivative according to claim 1, wherein the reaction temperature of the aromatic nucleophilic substitution reaction is −20 to 20° C.

5. The method for producing an optically active 2,3-bisphosphinoquinoxaline derivative according to claim 1, wherein the reaction temperature of the deboranation reaction is −20 to 80° C.

6. The method for producing an optically active 2,3-bisphosphinoquinoxaline derivative according to claim 1, wherein the solution B is obtained by adding a lithiating agent to a solution comprising an optically active R- or S-isomer of a hydrogen-phosphine borane compound represented by the formula (2) and an ether solvent.

7. The method for producing an optically active 2,3-bisphosphinoquinoxaline derivative according to claim 1, wherein the solution A or the solution B further comprises an ether solvent, and ratio by volume of the ether solvent to the coordinating solvent which can be coordinating with lithium after adding the solution B to the solution A is 1.0:0.25 to 1.0:100.0.

8. A method for producing an optically active phosphine transition metal complex represented by the following formula (4), the method comprising:

a first step of preparing solution A comprising 2,3-dihalogenopyrazine represented by the following formula (1)

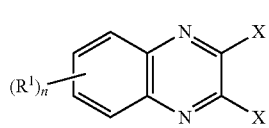

(1)

wherein X represents a halogen atom, $R^1$ represents a monovalent substituent, and n is an integer of 0 to 4, and a coordinating solvent which can be coordinated with lithium, and lithiating one of an optically active R-isomer and an optically active S-isomer of a hydrogen-phosphine borane compound represented by the following formula (2)

(2)

wherein $R^2$ and $R^3$ are an optionally substituted linear or branched alkyl group having 1 to 10 carbon atoms, an optionally substituted cycloalkyl group or an optionally substituted phenyl group, $R^2$ and $R^3$ are different from each other, and * represents an asymmetric center on a phosphorus atom, to give a lithiated phosphine borane compound, adding solution B comprising the lithiated phosphine borane compound to the solution A to perform an aromatic nucleophilic substitution reaction, and then performing a deboranation reaction by adding a deboranating agent, thereby producing the optically active 2,3-bisphosphinopyrazine derivative represented by the following formula (3) as a result of the deboranation reaction,

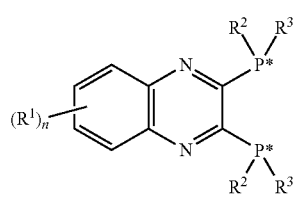

(3)

; and a second step of reacting the 2,3-bisphosphinopyrazine derivative represented by formula (3) with a transition metal salt of gold, copper or silver to obtain the optically active phosphine transition metal complex represented by the following formula (4),

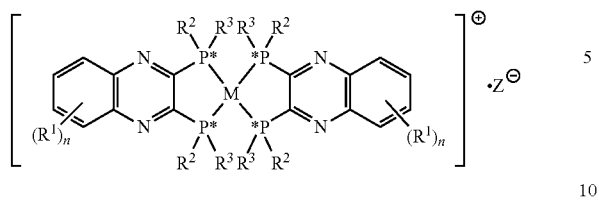
(4)
M represents a transition metal atom selected from the group consisting of gold, copper and silver; and $Z^-$ represents an anion.
* * * * *